United States Patent [19]
Houtman

[11] Patent Number: 5,735,262
[45] Date of Patent: Apr. 7, 1998

[54] SOLAR ENERGY DIFFUSER

[75] Inventor: William H. Houtman, Ann Arbor, Mich.

[73] Assignee: Stirling Thermal Motors, Inc., Ann Arbor, Mich.

[21] Appl. No.: 685,927

[22] Filed: Jul. 22, 1996

[51] Int. Cl.$^6$ .................................................. F24J 2/46
[52] U.S. Cl. .......................... 126/649; 126/680; 126/701
[58] Field of Search ................................. 126/648, 649, 126/650, 709, 710, 680, 907, 705, 701

[56] References Cited

U.S. PATENT DOCUMENTS

| | | | |
|---|---|---|---|
| 4,018,211 | 4/1977 | Barr | 126/907 |
| 4,019,496 | 4/1977 | Cummings | 126/649 |
| 4,262,657 | 4/1981 | McCullough et al. | 126/649 |
| 4,334,524 | 6/1982 | McCullough et al. | 126/709 |
| 4,475,538 | 10/1984 | Percival et al. | 126/648 |
| 4,791,910 | 12/1988 | Ishid et al. | 126/648 |

FOREIGN PATENT DOCUMENTS 2305697  10/1976  France .................................. 126/649

OTHER PUBLICATIONS

Holland, "Honeycomb Devices in Flat-Plate Solar Collectors", Solar Energy, No. 13, pp. 193–221, Pergamon Press (1971).

Primary Examiner—James C. Yeung
Attorney, Agent, or Firm—Harness, Dickey & Pierce, PLC

[57] ABSTRACT

A diffuser to be used with a solar energy concentrator and a solar energy receiver to more uniformly distribute solar energy to the receiver and to reduce the amount of energy lost due to circulation of air into and out of the receiver. A portion of the solar energy passing through the energy diffusing cavities within the diffuser is reflected by the cavity walls and reoriented and diffused before being emitted to the receiver. The geometry of the energy diffusing cavities and the reflective characteristics of the cavity walls can be engineered to provide the desired degree of diffusional effect. The diffuser reduces the likelihood of inadvertent hot spots being formed, which allows the designed maximum receiver energy flux to be closer to the receiver tube material limits and allows for smaller, more compact, more efficient receivers. The diffuser also limits the circulation of air in the vicinity of the receiver tubes, which reduces energy losses and increases the overall efficiency of the system. These changes can substantially increase the overall efficiency of a solar powered electrical generation system incorporating the inventive diffuser.

20 Claims, 2 Drawing Sheets

5,735,262

1

SOLAR ENERGY DIFFUSER

BACKGROUND AND SUMMARY OF THE INVENTION

This invention is related to solar energy collection systems and more particularly to a diffuser for use in conjunction with a solar energy concentrator and a solar energy receiver to more uniformly distribute the solar energy coming into the solar energy receiver and to reduce the amount of energy lost from the solar energy receiver due to the circulation of hot air out of and relatively cool air into the receiver.

Plans are under consideration at several utility companies to develop large fields of solar powered electrical generators to generate additional quantities of electricity needed during peak electrical demand periods. Because peak demand periods for electrical service occur during daylight hours, when solar powered electrical generators are operable, and demands for electrical service are often substantially reduced at night, when solar powered electrical generators are inoperable, solar powered electrical generators offer an ideal source of electricity for utility companies to compensate for this daily fluctuation in electrical service demand.

Utility companies are interested in not only being environmentally sensitive by using sources of renewable energy, such as solar energy, and avoiding the generation of pollutants associated with fossil fuel and nuclear power generation systems. They are also interested in reducing the costs associated with constructing, operating and eventually dismantling additional nuclear or fossil fuel powered electricity generating facilities. Fuel costs, particularly the costs of fossil fuels such as oil, have fluctuated wildly in the past and utility companies are interested in developing sources of energy that would not be subject to these price fluctuations. Fields of solar concentrators combined with Stirling cycle engines connected to electrical generators are being seriously considered for these types of electricity generation applications. The Stirling cycle engines and related devices for utilizing solar energy that could be used in connection with the inventive solar energy diffuser could include those previously developed by the Assignee of the present invention, Stirling Thermal Motors, Inc., including those described in U.S. Pat. Nos. 4,707,990; 4,715,183, 4,785,633, and 4,911,144, which are hereby incorporated herein by reference.

To cost effectively generate electricity on a commercial scale utilizing solar energy concentrators, solar energy receivers, Stirling cycle engines, and electrical generators in combination, the solar concentrators must be constructed using reflectors that have relatively imperfect optical characteristics, such as mirrors formed by attaching the edges of a mirrorized membrane material to a rigid frame and drawing a vacuum on the back of the membrane to cause it to form a concave reflective surface. Relatively perfect reflectors, such as the laboratory grade mirrors used in telescopes, are far too expensive to be used in commercial solar collection systems.

Instead of manufacturing extremely large single reflectors, it is often more cost effective to assemble a collection of smaller reflectors (also called facets) into an array that simulate the reflective characteristics of a larger single reflector. This array of smaller reflectors collects the majority of the solar energy that could be collected by an equivalently sized singe reflector, but they are much easier to manufacture and maintain. Because each facet of the reflector array has slightly different optical characteristics

2 and can never be perfectly aligned with respect to the solar energy receiver, the solar energy concentrated onto the solar energy receiver by an array of reflector facets will necessarily be less uniform than an equivalently sized singe reflector.

Environmental factors, such as wind, and mechanical factors, such as material fatigue, can also dynamically change the distribution of the energy concentrated by the reflectors into the receiver.

When designing and engineering a solar energy receiver, it is preferred that the receiver tubes which absorb the solar energy be as short as possible. Additional receiver tube length causes additional frictional energy losses and reduces the efficiency of the receiver system. The materials used to fabricate the tubes have inherent limitations, however, that limit the maximum amount of energy flux that the tubes can be subjected to without failing. While the temperatures of the tube walls are generally regulated by the working fluid circulated within the tubes, inadvertently high energy concentrations can cause "hot spots" that can lead to catastrophic tube failures.

Solar reflectors are typically aligned with respect to the solar energy receivers so that the focal point of the reflector is located behind the receiver tubes. The expected concentration of solar energy in the vicinity of the receiver tubes in this configuration can be visualized as a doughnut or innertube shaped area of high energy flux. If the reflectors are not optically perfect or not properly positioned and aligned, hot spots (areas of inadvertently over-concentrated energy) can be formed. If the energy flux in one of these hot spots is sufficiency high, the tube material limitations can be exceeded and the tubes can fail. To compensate for the normal level of nonuniform flux distribution that would be expected under these circumstances and to prevent peak flux levels from causing the tube temperatures to exceed their designed material limits, a large safety margin between expected flux levels and tube material maximum allowable flux levels had to be built into prior art solar receivers. To provide this large safety margin, the receivers were placed well outside of the optimal focal distance of the reflectors, the receivers were contained within chambers which were larger than otherwise necessary to accommodate this less focused energy, and the receiver tube lengths were increased to allow them to capture more of this less focused solar energy. While these modifications addressed the hot spots/ tube failures problem, it designed in significant inefficiencies into prior art solar energy receivers and the entire solar energy collection systems.

Previous attempts to address this problem have focused on attempting to more precisely tune the reflectors to more closely regulate the energy flux seen by the receivers. While attempts to improve both the optical qualities of low cost reflectors and the ability to properly position and align these types of reflectors will obviously continue, the inventive diffuser takes the opposite approach. The diffuser receives the imperfectly focused solar energy collected by prior art solar collectors and diffuses the solar energy before it contacts the receiver. This allows the receiver to be designed with an expected flux level that is closer to the material limits of the receiver tube itself, which can dramatically improve the performance characteristics of solar collection systems using conventional solar energy concentrators.

Another problem associated with conventional solar receiver units is the loss of energy associated with the circulation of air into and out of the receiver chamber. Solar energy receivers are typically located in a housing constructed of refractory bricks. The aperture through which the solar energy is received is generally narrower than the array of receiver tubes to limit the loss of energy out of the system.

In some prior art solar energy receivers, quartz lens were placed over the aperture to limit the loss of energy associated with the circulation of air into and out of the receiver chamber. These types of lenses, however, are quite expensive and as they become dirty, less and less of the available light energy is able to pass into the receiver chamber and is instead absorbed by the contaminates, which can lead to the failure of the lens.

The inventive diffuser reduces the convective energy losses associated with open prior art solar receiver chambers because the cellular structure of the inventive diffuser restricts the exchange of hot air in the vicinity of the receiver tubes with cooler external air, particularly air exchange due to turbulence associated with the flow of air generally parallel to the aperture of the receiver. The additional heat retained within the receiver chamber results in increased efficiency of the solar receiver unit and the entire solar energy collection system incorporating the diffuser.

Further objects, features and advantages of the invention will become apparent from a consideration of the following description and the appended claims when taken in connection with the accompanying drawings.

DETAILED DESCRIPTION OF THE PREFERRED EMBODIMENT

Figure 1:
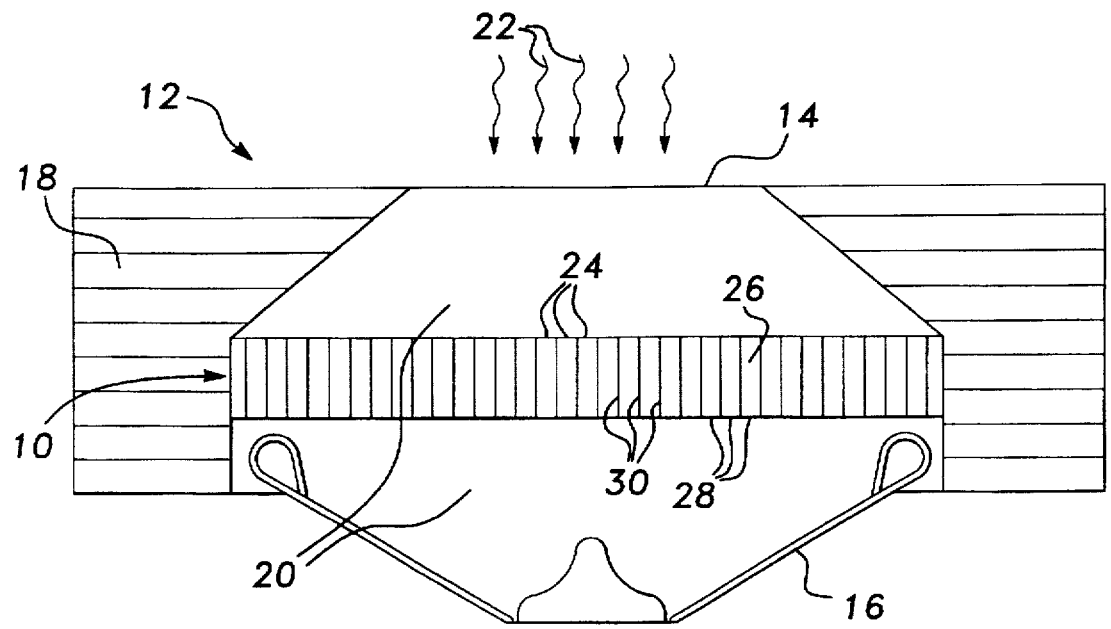
FIG. 1 is a cross section view of a solar energy receiver incorporating the inventive diffuser.

A diffuser in accordance with this invention is shown installed in a solar energy receiver in FIG. 1 and is generally designated by reference number 10. Diffuser 10 is installed in a solar energy receiver 12 between a receiver aperture 14 and receiver tubes 16. Solar energy receiver 12 has refractory bricks or fiberboard type insulation 18 which surround and retain heat within a receiver chamber 20. Solar energy 22 entering solar energy receiver 12 through receiver aperture 14, passes through the upper portion of receiver chamber 20 and enters diffuser 10 through a plurality of outer openings 24. From outer openings 24, solar energy 22 passes through a plurality of energy diffusing cavities 26 and is emitted from diffuser 10 at a plurality of inner openings 28. As will be discussed in more detail below, a portion of the solar energy passing through energy diffusing cavities 26 is reflected on one or more occasions by cavity walls 30 and is emitted from the cavities through inner openings 28 with a different and more diffused orientation than it had when it entered the cavities. A portion of the solar energy 22 passing through energy diffusing cavities 26 does not contact cavity walls 30 and is unaffected by diffuser 10. After being emitted from diffuser 10 at inner openings 28, solar energy 22 passes through the lower section of receiver chamber 20 and is substantially absorbed by receiver tubes 16. Working fluid circulated through receiver tubes 16 transfers solar energy 22 to a device that utilizes the energy, such as a Stirling cycle engine.

While diffuser 10 may be located anywhere between the solar concentrator and receiver tubes 16, it is preferable to place diffuser 10 as close as possible to receiver tubes 16. This allows the solar concentrators to be focused as if diffuser 10 was not present. Diffuser 10 then diffuses the incoming solar energy 22 to reduce the probability of inadvertently forming hot spots that could cause tube failures. The environment adjacent to receiver tubes 16 is severe, however, being subjected to both extremely high temperatures and wide temperature variations. Because diffuser 10 is not externally cooled, as are receiver tubes 16 by the working fluid, diffuser 10 must be able to radiate significant quantities of heat to survive in this harsh operating environment.

Figure 2:
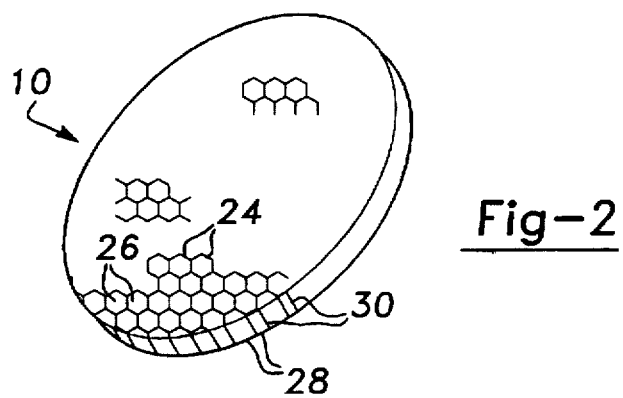
FIG. 2 is a perspective view of an embodiment of the inventive diffuser having energy diffusing cavities with hexagonal cross sections.

FIG. 2 shows an embodiment of diffuser 10 from a perspective view. Outer openings 24 and inner openings 28 (not shown) are hexagonally shaped and energy diffusing cavities 26 have hexagonally shaped cross sections. This shape allows the individual energy diffusing cavities 26 to be tightly bundled together within diffuser 10 and reduces the required thickness of cavity walls 30. Minimizing wall thickness is important because the portions of cavity walls 30 which are perpendicular to the direction of incoming solar energy 22 reflect solar energy away from diffuser 10 and the majority of this reflected energy will be emitted through receiver aperture 14 out of solar energy receiver 12 and lost. Minimizing the wall thickness is also important because it reduces the diffuser mass to surface area ratio which increases the ability of the diffuser to radiate heat. Bundled hexagonal shapes can also provide a great deal of structural strength to diffuser 10. Diffuser 10 will ideally be structurally self supporting and only connected to the remaining components of solar energy receiver 12 at its periphery, where the diffuser is mounted to refractory bricks 18. Diffuser 10 could alternatively be constructed of bundled tubes with circular, square or rectangular cross sections or a myriad of other alternative shapes to provide tightly bundled energy diffusing cavities. The commercial availability of engineering materials consistent with the disclosed embodiment, makes this a preferred commercial embodiment of diffuser 10.

While cavity walls 30 are shown in FIGS. 1 and 2 to be perpendicular to receiver aperture 14 and are shown to be uniformly parallel to one another, the inventive diffuser 10 is not restricted to these particular configurations. An alternative embodiment of the diffuser, for instance, could be constructed by determining the quantity of energy expected to enter each discrete energy diffusing cavity 26 from the solar concentrator and its relative orientation and then varying the orientation of cavity walls 30 to distribute this energy uniformly along the surfaces of receiver tubes 16.

Diffuser 10 may be made of any material that is highly reflective of solar energy 22 and capable of surviving under the extreme environmental conditions within solar energy receiver 12. Suitable materials for constructing diffuser 10 include ceramics and coated metal materials. Alumina-based ceramic materials fabricated into honeycomb sheet structures are believed to be the best commercially available material for the manufacturing the inventive diffuser. These types of ceramic materials can be highly reflective of incident solar energy and are also able to readily reradiate the solar energy absorbed by the diffuser. Honeycomb ceramic materials manufactured by Corning Incorporated, Corning, N.Y. 14831 may have acceptable engineering specifications for the inventive diffuser.

Figure 3:
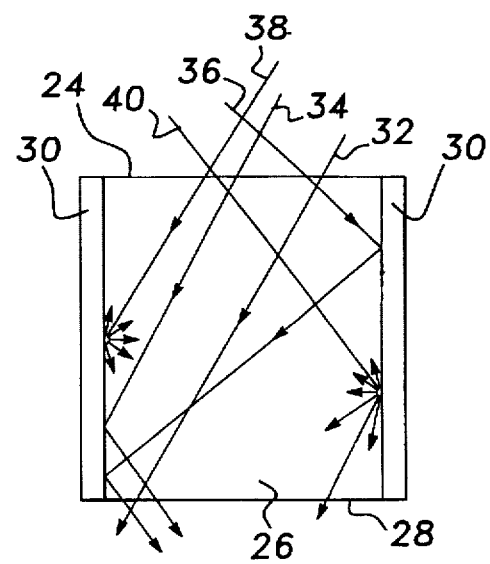
FIG. 3 is a close up cross sectional view of one of the energy diffusing cavities of the inventive diffuser from FIG. 2 showing various demonstrative solar energy raypaths.

In FIG. 3, a close up cross section view of an individual energy diffusing cavity is shown with a variety of demonstrative raypaths. The behavior of solar energy 22 can effectively be represented by raypaths which are parallel to the direction of propagation. In FIG. 3, incoming solar energy 22 enters energy diffusing cavity 26 through outer opening 24 and exits energy diffusing cavity 26 through inner opening 28. A portion of solar energy 22 entering energy diffusing cavity 26 through outer opening 24 is reflected by cavity walls 30 before it exits energy diffusing cavity 26 through inner opening 28. As will be seen below, this reflected solar energy has a different and more diffuse orientation when it exits energy diffusing cavity 26 through inner opening 28 than it had when it entered energy diffusing cavity 26 through outer opening 24.

Raypath 32 represents solar energy 22 which enters energy diffusing cavity 26 through outer opening 24 at a relative location within outer opening 24 and at an incidence angle that allows it to pass through energy diffusing cavity 26 without contacting cavity walls 30. If the cavity walls 30 of diffuser 10 are perpendicular to outer opening 24, any solar energy 22 which enters energy diffusing cavity 26 perpendicularly to outer opening 24 will pass through energy diffusing cavity 26 without being reoriented or diffused. The proportion of the solar energy 22 that will pass through energy diffusing cavity 26 unaltered is a function of the range of relative incidence angles of the energy entering energy diffusing cavity 26 and the geometry of the energy diffusing cavity. The greater the ratio is between the length of energy diffusing cavity 26 and the diameter of outer opening 24, the lower the proportion of solar energy 22 that will pass through energy diffusing cavity 26 without being reoriented and diffused.

Raypath 34 represents solar energy 22 which enters energy diffusing cavity 26 through outer opening 24 at a relative location within outer opening 24 and at an incidence angle such that solar energy 22 reflects once off of cavity wall 30 before exiting energy diffusing cavity 26 through inner opening 28. As can be seen from raypath 34, the solar energy 22 emitted from energy diffusing cavity 26 for these types of raypaths has an inverted directional orientation compared to the directional orientation these types of raypaths had when they entered energy diffusing cavity 26.

Raypath 36 represents solar energy 22 which enters energy diffusing cavity 26 through outer opening 24 at a relative location within outer opening 24 and at an incidence angle such that solar energy 22 reflects twice off of cavity wall 30 before exiting energy diffusing cavity 26 through inner opening 28. As can be seen from this raypath, the solar energy 22 is emitted from energy diffusing cavity 26 at an orientation identical to that it had when it entered energy diffusing cavity 26, but the raypath has been spatially displaced relative to the incoming raypath. Obviously there are raypaths where the solar energy is reflected off cavity walls 30 on 3, 4 or more occasions before it is emitted from energy diffusing cavity 26.

As can be seen by raypaths 34 and 36, solar energy reflecting off the side of cavity walls 30 will be reoriented in two ways, either directionally or spatially. These cavitational reorientation effects serve to scatter and diffuse the incoming solar energy by disrupting the focused character of the solar energy received from the solar energy concentrator.

In demonstrating the effects of energy traveling along raypaths 34 and 36, it was assumed that solar energy 22 will reflect specularly off cavity wall 30. Specular reflection is commonly referred to as mirror-like reflection, where the outgoing ray leaves the reflecting surface as a mirror image of the incoming ray. Specular reflection occurs when the surface is smooth compared to the wavelength of the incoming radiation (i.e. when the roughness of the surface is less than one-tenth of the wavelength of the reflected electromagnetic radiation). A second type of reflection, diffuse reflection, occurs when the surface roughness exceeds two times the wavelength of the electromagnetic radiation. When raypaths are diffusely reflected, the energy is reflected away from the surface in uniform hemispherical directions from the point of contact.

Raypath 38 demonstrates the effects of diffuse reflection off the surface of cavity wall 30. When solar energy 22 traveling along raypath 38 is diffusely reflected by cavity wall 30, the energy is reflected away from cavity wall 30 uniformly in all directions. A portion of the energy is reflected at angles where it will be directly emitted back out of the cavity, a portion of the energy is reflected at angles where it will directly passes through the cavity, and a portion of the energy is reflected at angles where the energy will reflect at least once more off a wall of the cavity before it leaves the cavity. A portion of the subsequently rereflected energy will eventually pass through the cavity and a portion will be emitted back out of the cavity.

As can be seen by raypath 38, solar energy 22 which diffusely reflects off the side of cavity walls 30 will be uniformly disoriented and will immediately lose any focused character. A portion of the diffusely reflected energy is reflected out of the diffuser, however, and is lost.

Raypath 40 demonstrates the effects of a mixed reflection that has both specular and diffuse characteristics. Mixed reflections typically occur when the roughness of the surface is between one tenth and two times the wavelength of the reflected electromagnetic radiation. In these types of reflections, a portion of the energy is reflected in the general mirror image direction, although a portion of the energy is also reflected in a generally diffuse manner.

To design an optimal solar energy diffuser for any particular solar energy collection system, the specular vs. diffusive reflective characteristics of the materials or materials which make up cavity walls 30 and the relative geometry of the energy diffusing cavities must be balanced to provide the desired degree of diffusion in the diffuser. The ability of the materials which will make up the diffuser to survive in the environment within receiver chamber 20 must also be considered. Long narrow cavities that have cavity walls that are highly diffusely reflective will diffuse substantially more of the incoming solar energy than short broad cavities that have cavity walls that are highly specularly reflective. It is also possible to select materials that exhibit wavelength dependent effects, such as materials which reflect the vast majority of the incident energy only in the wavelength spectrum of the incoming solar radiation (from 0.2 to 2.0 micrometers).

As the ratio of the length of energy diffusing cavity to the diameter of energy diffusing cavity increases, the apparent emissivity of the cavity approaches the value of 1 which holds for a black body. The closer the apparent emissivity of the cavity is to 1, the less of the energy passing into the diffuser which will eventually be reflected back through the diffuser. An embodiment of diffuser 10 having a matrix of energy diffusing cavities which are approximately 10 millimeters across and 50 millimeters long is expected to produce a satisfactory diffusing effect and a uniform pattern of energy exiting the diffuser.

Because diffuser 10 reorients and diffuses the incoming solar energy 22, the likelihood of hot spots is reduced and solar energy receiver 12 can be designed with expected energy flux levels which are much closer to the material limitations of receiver tubes 16. This allows the solar energy concentrators to be positioned where they will provide a more focused supply of solar energy into the solar energy receiver, and allow the size of both receiver chamber 20 and receiver tubes 16 to be reduced to accept this more focused energy, which can dramatically increase the overall efficiency of the solar energy receiver and the entire solar energy collection system.

Figure 4A:
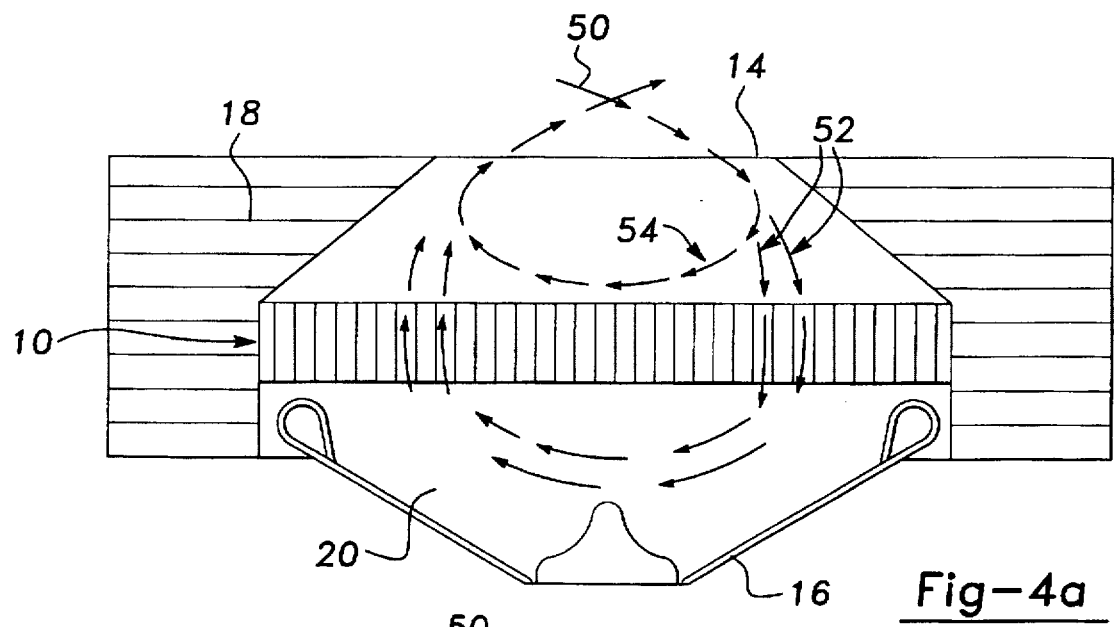
FIGS. 4a and 4b are cross sectional views of two solar energy receivers, the first incorporating the inventive diffuser and the second without the inventive diffuser.
Figure 4B:
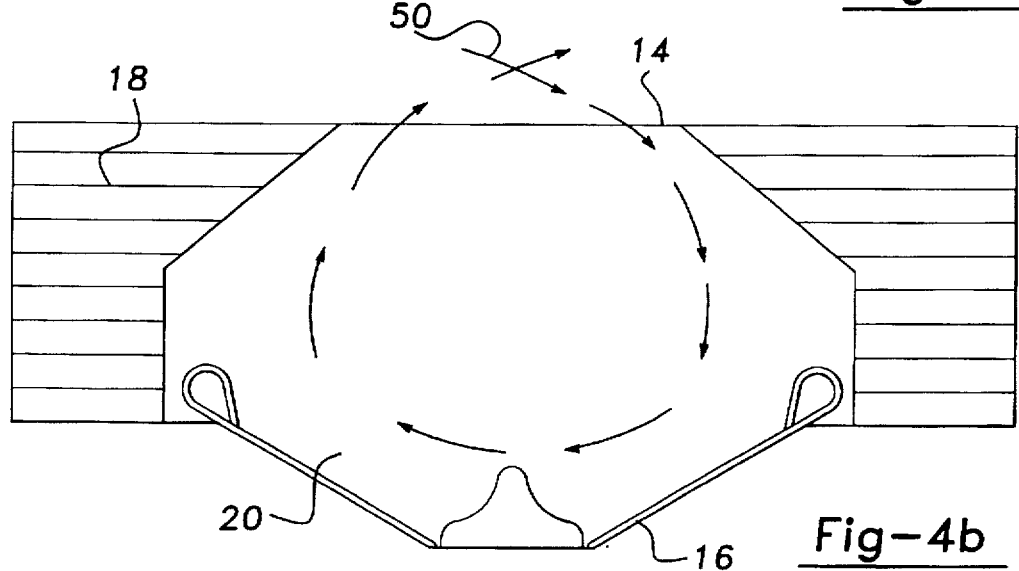

A second type of efficiency is also gained by use of the inventive diffuser. FIGS. 4a and 4b show the circulation of air within a solar energy receiver incorporating diffuser 10 and a conventional open solar energy receiver without the inventive diffuser. In FIG. 4a, a generally cross aperture air current 50 passes through receiver aperture 14 and into upper receiver chamber 20. As air current 50 circulates within upper receiver chamber 20, an unbaffled portion 52 of the air current will pass through the energy diffusing cavities 26 of diffuser 10, pass into the lower portion of receiver chamber 20, come into contact with receiver tubes 16, and exit the lower portion of receiver chamber 20 through the energy diffusing cavities 26. The other baffled portion 54 of air current 50 will be deflected along the upper surface of diffuser 10 and will not circulate into the lower portion of receiver chamber 20. The portion of the air current 50 that will be deflected by diffuser 10 will depend on the wind velocity, the incidence angle of the air current as it contacts the diffuser, the geometry of each cavity and the relative smoothness or roughness of the material used to manufacture the diffuser. FIG. 4b shows a similar generally cross aperture air current 50 passing through receiver aperture 14 and into receiver chamber 20 when diffuser 10 is not present. Because there is no physical restriction that would separate the upper portion of receiver chamber 20 from the lower portion of the receiver chamber, air current 50 tends to circulate generally along the outside of the receiver chamber, where it comes into contact with receiver tubes 16 and then exits the receiver chamber through receiver aperture 14. Because the air circulating in the immediate vicinity of receiver tubes 16 removes energy from the solar energy receiver 12 and the diffuser limits the amount of air circulating in this area, the inventive diffuser increases the efficiency of the solar energy receiver over prior open solar receivers.

Figure 5:
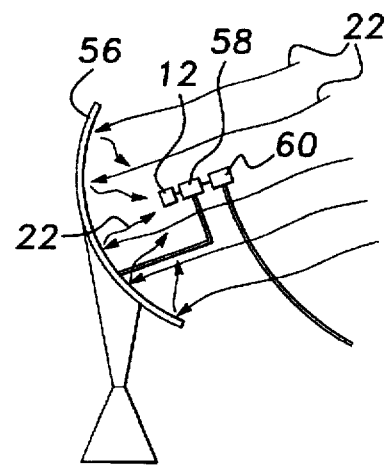
FIG. 5 is a schematic view of a solar powered electrical generation system incorporating the inventive diffuser.

FIG. 5 shows a typical solar energy to electrical energy conversion system incorporating the inventive diffuser. A solar energy concentrator 56, consisting generally of a parabolic reflector having an array of parabolic reflector facets, concentrates solar energy into solar energy receiver 12. The solar energy is absorbed by the receiver tubes and transferred to the working fluid. The working fluid is then circulated to a Stirling cycle engine 58 which converts the heat energy into rotational mechanical energy. This rotational mechanical energy is converted by electrical generator 60 into electrical energy which can be transmitted to an electrical power distribution grid. As discussed above, the inventive diffuser allows optically imperfect cost effective reflectors to be focused more closely on the receiver tubes at expected flux levels that are closer to the material limits of the tubes, with less of a concern that unintended hot spots will be formed that could cause catastrophic tube failures, and, through the use of shorter tubes and more compact receiver housings, increasing the overall efficiency of the solar energy receiver. In addition, the diffuser baffles incoming air and reduces the energy losses associated with the exchange of air into and out of the receiver chamber. These increased efficiencies can dramatically increase the overall efficiency of the entire solar powered electrical generation system.

It is to be understood that the invention is not limited to the exact construction illustrated and described above, but that various changes and modifications may be made without departing from the spirit and scope of the invention as defined in the following claims.

I claim:

1. A solar energy receiver assembly for receiving solar energy from a solar energy concentrator, said solar energy receiver assembly comprising:

a solar energy receiver having a receiver chamber and an open receiver aperture through which air and solar energy enters said receiver chamber, means for absorbing solar energy, fixed to said solar energy receiver within said receiver chamber and located opposite said receiver aperture, a diffuser located within said receiver chamber between said receiver aperture and said means for absorbing solar energy, said diffuser having a plurality of open cavities, each of said cavities having an outer opening, an inner opening, and side walls, said cavities positioned so said solar energy is received into said cavities from said solar energy concentrator though said outer openings and is emitted from said cavities to said means for absorbing solar energy through said inner openings, said cavities allowing air within said receiver chamber to circulate between said receiver aperture and said means for absorbing solar energy, and said side walls restricting the circulation of air within said receiver chamber near said means for absorbing solar energy.

2. A solar energy receiver assembly according to claim 1 wherein said cavities are tightly bundled.

3. A solar energy receiver assembly according to claim 1 wherein said diffuser is self supporting.

4. A solar energy receiver assembly according to claim 1 wherein said diffuser comprises a relatively thin, flat structure positioned approximately parallel to said receiver aperture.

5. A solar energy receiver assembly according to claim 1 wherein the ratio of the average length of said side walls divided by the average width of said outer openings is between 1 and 7.

6. A solar energy receiver assembly according to claim 5 wherein the ratio of the average length of said side walls divided by the average width of said outer openings is between 4 and 6.

7. A solar energy receiver assembly according to claim 1 wherein said energy diffusing cavities have hexagon shaped cross sections.

8. A solar energy collector for collecting solar energy, said solar energy collector comprising:

a solar energy receiver having energy receiving means for receiving solar energy, said energy receiving means having a maximum energy flux level, energy concentrating means for concentrating solar energy and focusing said solar energy toward said energy receiving means, said energy concentrating means capable of producing concentrations of focused solar energy at said energy receiving means in excess of said maximum energy flux level, and diffusion means, positioned between said energy concentrating means and said energy receiving means, for receiving said focused solar energy from said energy concentrating means, emitting said focused solar energy toward said energy receiving means, and diffusing said focused solar energy, thereby more evenly distributing said focused solar energy and reducing the likelihood of producing concentrations of solar energy in excess of said maximum energy flux level at said energy receiving means.

9. A solar energy collector according to claim 8 wherein said diffusion means is formed from material highly reflective of solar energy.

10. A solar energy collector according to claim 8 wherein said diffusion means has a plurality of energy diffusion cavities, each of said energy diffusion cavities having an outer opening, an inner opening, and side walls.

11. A solar energy collector according to claim 10 wherein said energy diffusion cavities have hexagon shaped cross sections.

12. A solar energy collector according to claim 8 wherein said solar energy receiver defines a receiver chamber and said diffusion means is located within said receiver chamber.

13. A solar energy collector according to claim 8 wherein said energy receiving means comprises heater tubes and working fluid circulating within said heater tubes.

14. A solar energy collector according to claim 8 wherein said diffusion means is formed from alumina-based ceramic material.

15. A solar energy collector for collecting solar energy, said solar energy collector comprising:
- a solar energy receiver defining a receiver chamber and having an open receiver aperture through which air and solar energy enters said receiver chamber,
- said solar energy receiver further having a plurality of receiver tubes and working fluid circulating through said receiver tubes, said receiver tubes having a maximum energy flux level said heater tubes may be subjected to without failing,
- energy concentrating means for concentrating solar energy and focusing said solar energy toward said receiver tubes, said energy concentrating means capable of producing concentrations of solar energy at said receiver tubes in excess of said maximum energy flux level,
- a diffuser, positioned within said receiver chamber and between said receiver aperture and said receiver tubes, for receiving said focused solar energy from said energy concentrating means, emitting said focused solar energy to said receiver tubes, and diffusing said focused solar energy, thereby more evenly distributing said focused solar energy and reducing the likelihood of producing concentrations of solar energy in excess of said maximum energy flux level at said receiver tubes,
- said diffuser having a plurality of open cavities, each of said cavities having an outer opening, an inner opening, and side walls,
- said cavities allowing air within said receiver chamber to circulate between said receiver aperture and said means for absorbing solar energy, and
- said side walls restricting the circulation of air within said receiver chamber near said receiver.

16. A solar energy collector according to claim 15 wherein said diffuser has an exterior surface and said exterior surface is formed from material highly and primarily specularly reflective of solar energy.

17. A solar energy collector according to claim 15 wherein said diffuser is formed from an alumina-based ceramic material.

18. A solar energy collector according to claim 15 wherein said cavities have hexagon shaped cross sections.

19. A solar energy collector according to claim 15 wherein the ratio of the average length of said side walls divided by the average width of said outer openings is between 1 and 7.

20. A solar energy receiver assembly according to claim 19 wherein the ratio of the average length of said side walls divided by the average width of said outer openings is between 4 and 6.

* * * * *